United States Patent

Bartow et al.

[11] Patent Number: 5,460,079
[45] Date of Patent: Oct. 24, 1995

[54] MANIFOLD ASSEMBLY FOR FEEDING DOUGH

[75] Inventors: George Bartow, Baltimore; Randolph F. Smith, Jr., Ellicott City, both of Md.

[73] Assignee: DCA Food Industries, Inc., Garden City, N.Y.

[21] Appl. No.: 314,052

[22] Filed: Sep. 28, 1994

[51] Int. Cl.[6] ............ A21C 3/04; A21C 3/06; A21C 3/08; A21C 9/00
[52] U.S. Cl. .............. 99/353; 99/407; 99/450.1; 99/450.2; 425/319; 425/321; 425/334; 425/391
[58] Field of Search ............ 99/353, 403, 407, 99/409, 450.1, 450.2; 425/319, 133.1, 334, 391, 392, 94, 208, 315, 288, 321, 297, 275, 439, 464, 467, 372, 373; 426/512, 501, 523, 516

[56] References Cited

U.S. PATENT DOCUMENTS

| | | | |
|---|---|---|---|
| 917,581 | 4/1909 | Gerdes . | |
| 1,998,560 | 4/1935 | Smith . | |
| 2,080,584 | 5/1937 | Streich . | |
| 2,119,673 | 6/1938 | Gielow . | |
| 2,216,787 | 10/1940 | Steadman et al. . | |
| 2,337,526 | 12/1943 | Steadman et al. . | |
| 3,695,171 | 10/1972 | Hartley et al. | 99/407 |
| 3,812,775 | 5/1974 | Sijbring | 99/407 |
| 3,859,018 | 1/1975 | Gugler . | |
| 3,872,783 | 3/1975 | Fries et al. | 99/407 |
| 4,098,179 | 7/1978 | Fleishaker et al. | 99/353 |
| 4,346,649 | 8/1982 | Wilke et al. | 425/288 |
| 4,422,372 | 12/1983 | Hoezee | 425/311 |
| 4,445,838 | 5/1984 | Groff . | |
| 4,504,511 | 3/1985 | Binley . | |
| 4,574,690 | 3/1986 | Chiao et al. | 425/133.1 |
| 4,694,742 | 9/1987 | Dover | 99/407 |
| 4,767,638 | 8/1988 | Uhrovic . | |
| 4,859,165 | 8/1989 | Hoashi | 426/516 |
| 4,954,064 | 9/1990 | Slegenthaler . | |
| 4,979,434 | 12/1990 | van Lengerich | 425/208 |
| 5,333,538 | 8/1994 | Sawa | 99/353 |
| 5,351,607 | 10/1994 | Rini et al. | 99/407 |

Primary Examiner—Timothy F. Simone
Attorney, Agent, or Firm—Amster, Rothstein & Ebenstein

[57] ABSTRACT

A manifold assembly for feeding dough through a plurality of dies simultaneously under substantially equal pressure, includes a longitudinally-extending manifold having an inlet end for receiving dough under pressure, an outlet end defining a plurality of extruder dies, and a top, a bottom and sides connecting the inlet and outlet ends. A chevron-shaped dough guide intermediate the inlet and outlet ends distributes the dough to the sides thereof, the guide being configured and dimensioned to distribute the dough to the dies simultaneously under substantially equal pressure. Preferably, the manifold top is concave, and the guide does not extend to the concave top, so some of the dough can pass between the guide and the concave top.

11 Claims, 2 Drawing Sheets

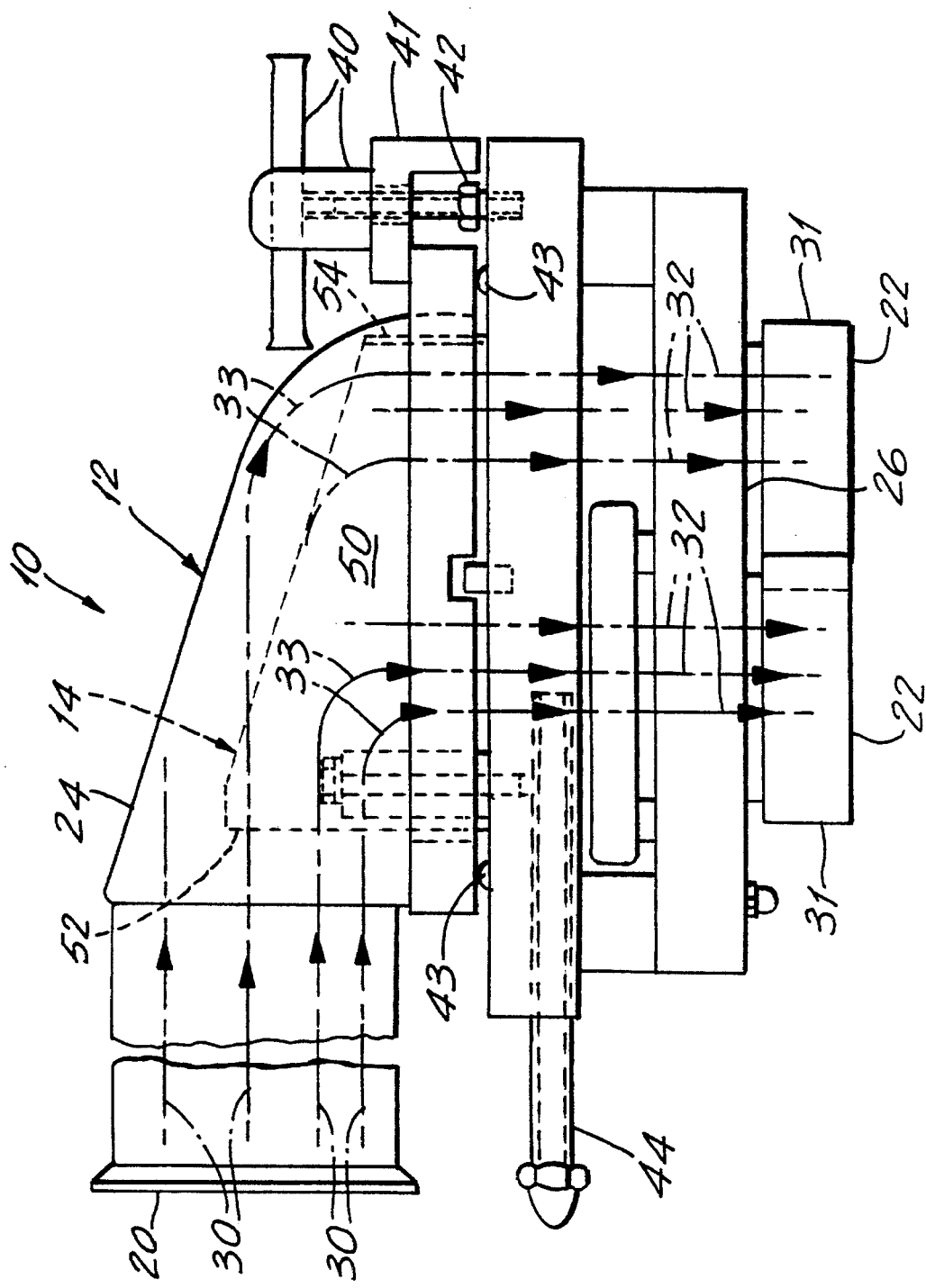

MANIFOLD ASSEMBLY FOR FEEDING DOUGH

BACKGROUND OF THE INVENTION

The dough through a plurality of dies simultaneously present invention relates to a manifold assembly for feeding dough through a plurality of dies simultaneously and, more particularly, such an assembly which feeds the dough under substantially equal pressure.

Twist stick cake donuts are manufactured in one of three alternative ways: by hand cutting strips of dough and manually twisting them to the desired shapes, performing the same manual twisting action on a conventional ring donut, or using the Frenchette machine. The Frenchette machine feeds extrudes two twisted ropes of dough into the frying fat of very narrow, dedicated fryer so that the twist stick products may be cut while in the frying fat. The cutting device of the Frenchette machine is mounted directly over the narrow dedicated fryer, and the rotary extrusion dies of the Frenchette machine are fed by fluted rollers in order to provide pressure to the dough for the purposes of extrusion through the dies.

Typically, the Frenchette machine has only two extrusion dies as it is impossible to provide uniformity of pressure at the exit end of the machine for more than two dies. The dough is fed in the Frenchette machine by fluted rollers which are notorious for producing a lack of uniformity when more than two dies are fed by them; indeed, it is even difficult to get uniformity across a Frenchette machine with only two dies if the dies are widely spaced apart. Attempts to overcome this disadvantage of the ordinary fluted rollers include the use of a double roller system having two sets of rollers, but this is cumbersome and mandates a large profile or footprint for the machine. Another approach has been to use specially design fluted rollers to compensate for the natural non-uniformity, but these are extremely expensive and must be specially designed for the machine.

Nonetheless, the Frenchette machine remains in use in the industry as the other machines employing fluted rollers to feed a multiplicity of dies do not produce a twist stick product.

Accordingly, it is an object of the present invention to provide a manifold assembly for feeding dough through a plurality of dies simultaneously under substantially equal pressure.

Another object is to provide such a manifold assembly which can be used to feed a multiplicity of dies greater than two.

A further object is to provide such a manifold assembly for use in manufacturing a twist stick product.

It is another object of the present invention to provide such a manifold assembly which is inexpensive to manufacture, simple and economical to use, and easy to maintain.

SUMMARY OF THE INVENTION

It has now been found that the above and related objects of the present invention are obtained in a manifold assembly for feeding dough through a plurality of dies simultaneously under substantially equal pressure. The assembly comprises a manifold having an inlet end for receiving dough under pressure and a dough-flow axis, an outlet end defining a plurality of extruder dies, each die having a dough-flow axis, and a top, a bottom and sides connecting the inlet and outlet ends. The inlet end axis is generally transverse to the die axes. A substantially chevron-shaped dough guide is disposed intermediate the inlet and outlet ends for distributing the dough to the sides thereof, the guide being configured and dimensioned to distribute the dough to the dies simultaneously under substantially equal pressure.

In a preferred embodiment, the guide is generally centrally disposed intermediate the manifold sides, and points towards the inlet end. Further, the manifold top is concave, and the guide does not extend to the concave top, so that some of the dough can pass between the guide and the concave top. The guide preferably has two legs defining at one end a common point and at the other end a free end of each leg, the guide decreasing in height from the common point thereof towards the leg free ends.

Preferably the manifold has a single inlet end and at least 12 dies. The dies are disposed in a horizontal plane disposed below the inlet end, and more particularly in a plurality of horizontally spaced rows.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 2 is a fragmentary side elevational view thereof, also with portions thereof removed to reveal details of internal construction.

DETAILED DESCRIPTION OF THE PREFERRED EMBODIMENTS

Figure 1:
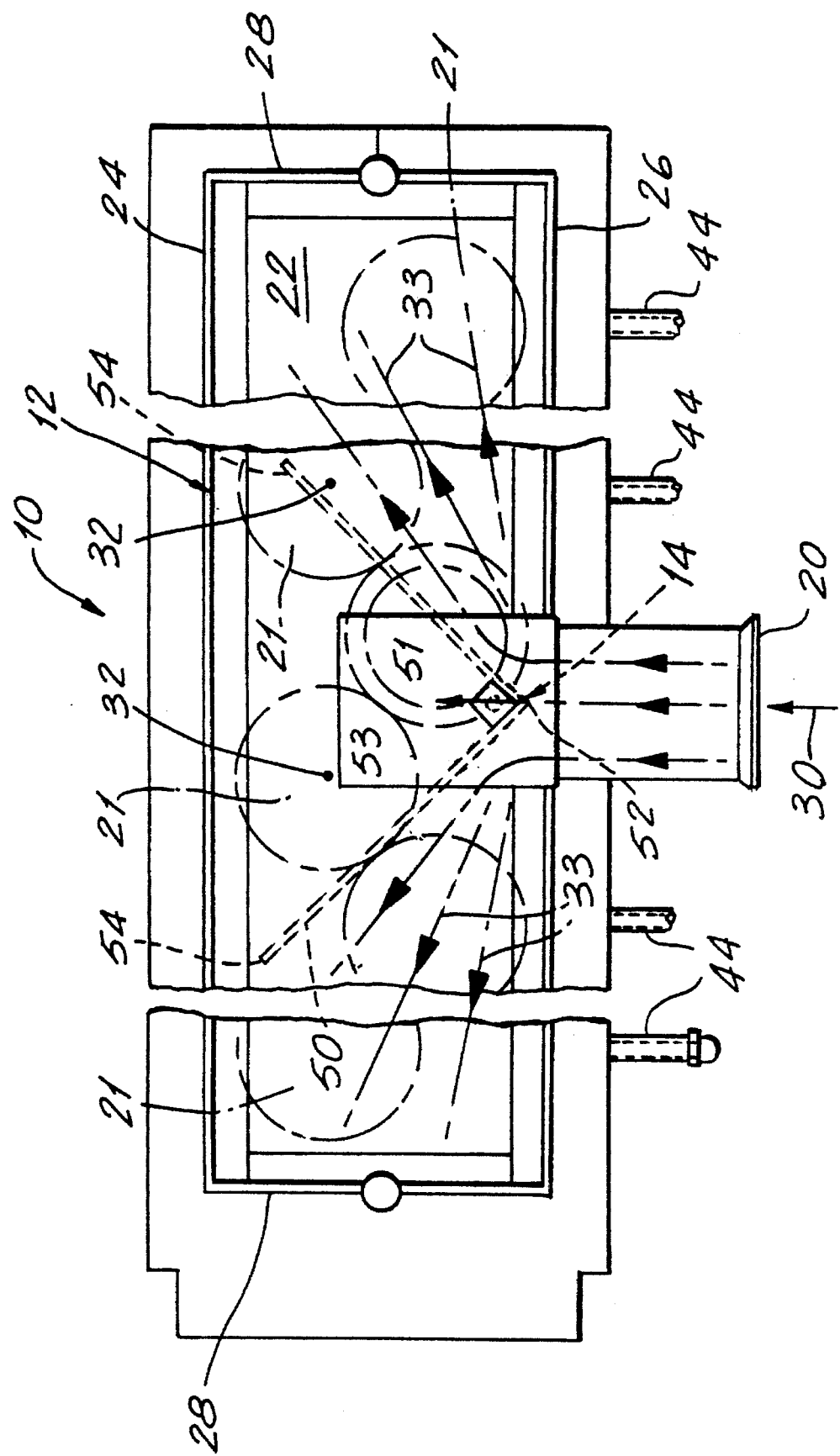
FIG. 1 is top plan view of a manifold assembly of the present invention, with portions thereof removed to reveal details of internal construction.

The present invention relates to a manifold assembly for use in a machine for the manufacture of twist stick doughnuts. The various unit functions of the machine—that is, the extrusion rate, the cutting rate, the twisting rate, and the conveyor speed—can be varied to produce various shaped products with more or less twist and at various lengths and weights. In addition, the machine may be used to produce a conventional (that is, non-twisted) stick doughnut by holding the rotating dies in a stationary position. Because of an immense increase in production rate, the machine allows the production of twist stick cake doughnuts at a lower cost. In order to obtain products which are of uniform weight, appearance and organoleptic properties, the manifold assembly of the machine must feed dough through a plurality of dies simultaneously under substantially equal pressure.

Referring now to the drawing, and in particular to FIGS. 1 and 2 thereof, therein illustrated is a manifold assembly according to the present invention, generally designated by the reference numeral 10, for feeding dough through a plurality of dies simultaneously under substantially equal pressure. The assembly 10 basically comprises a manifold, generally designated 12, and a dough guide, generally designated 14, disposed therein.

The manifold 12 has an inlet end 20 for receiving dough under pressure, an outlet end 22 defining a plurality of extruder dies or die sub-assemblies 31 (best seen in FIG. 1) and a top 24, a bottom 26 and sides 28 connecting the inlet and outlet ends 20, 22. The dough passes through the inlet end 20 along a relatively large dough-flow axis (represented by the arrows 30) and through each die 31 along a dough-flow axis (represented by the arrows 32). A unique structural feature of the manifold of the present invention is the disposition of the inlet end axis 30 generally transverse to the die axes 32. More particularly, the various dies 31 of the manifold 12 are disposed in a horizontal plane, the horizontal plane being disposed in its entirety below the inlet end 20 (as best seen in FIG. 2 where only two dies 31 are visible). Thus, the dough must transverse a right angle (see arrows 33) as it passes from the inlet end 20 to the outlet end 22. Typically the dies 31 are disposed in a plurality of horizontally spaced rows (as best seen in FIG. 1). As illustrated, a preferred manifold has a single inlet end 20 and twelve dies 31 arranged in two horizontally spaced, staggered rows of six each, the dies of one row being disposed intermediate and overlapping a pair of dies of another row. Thus, while the dies 31 in a given row may be horizontally spaced apart, in order to save space all of the dies are closely adjacent along both the horizontal axis and the vertical axis. Of course, a greater or lesser number of dies 31 (but preferably at least three dies 31) or rows may be used.

Typically each die 31 is a conventional die sub-assembly comprising a nozzle through which the dough passes, a multi-apertured die disc at the outlet end of the nozzle, an adapter cap which releasably engages the nozzle to maintain the die disc on the nozzle end, and a gear secured to the nozzle for rotating the nozzle, die disc and adapter cap relative to the manifold. Typically the gear of each die sub-assembly 31 meshes with the adjacent gears of adjacent die sub-assemblies 31 so that each of the die sub-assemblies 31 are entrained together. The die sub-assemblies 31 are mounted in bearings and lubricated by grease fittings, with the gear train being powered by a variable speed drive. Each die disc defines a plurality of apertures therethrough (three apertures being typical) through which the dough is extruded and twisted to form a continuous braid when the die disc is rotated. Each die disc is removable from the nozzle by unscrewing of the adapter cap. Rotary, or more accurately rotatable, die sub-assemblies are well known in the extrusion art and need not be described herein in any great detail.

The manifold assembly 10, as illustrated, has twelve die sub-assemblies 31 and thus makes twelve continuous braids of dough, each containing multiple strands (here, three strands) of dough extruded and twisted together by the rotating die disc. Untwisted or standard cake sticks may be produced by using a suitable die disc (for example, with just a single central aperture) and turning off the rotary action produced by the gears of the die sub-assemblies.

The various components of the manifold assembly 10 are held together by conventional means—for example, hand nut assemblies 40, clamp weldments 41, lock washer and nut sets 42, O-ring cords 43, and the like, as best seen in FIG. 2. The die sub-assemblies 31 may be an integral part of the manifold 12 or a separate component communicating with the manifold 12 through openings therein corresponding to the die sub-assemblies 31.

While the pump is preferably non-pulsating and pushes the dough through the manifold 12 in a continuous, steady flow, the tendency is for the highest pressures to occur in the entry area and center of the manifold 12, with lower pressures being to the left and right thereof as the dough moves to the outlet end 22 of the manifold 12 and simultaneously down through the die sub-assemblies 31. The dough guide 14 partially restricts the flow in the manifold 12 adjacent the entry end 20 in order to create a relatively uniform distribution of flow down through the die sub-assemblies 31.

The dough guide 14 is substantially chevron-shaped although the point of the chevron may be blunted or rounded. It is disposed intermediate the inlet and outlet ends 20, 22 of the manifold 12 for distributing the dough to the sides thereof, that is, towards the manifold sides 28. More particularly, the guide 14 is configured and dimensioned to distribute the dough to the several dies 31 simultaneously under substantially equal pressure (once the manifold is full of dough). The point of the guide 14 is preferably generally centrally disposed intermediate the manifold sides 28 and points towards the inlet end 20. Preferably the guide 14 has two linear legs 50 joined in a 90° "V" (or "U") by a weld 51. The two legs 50 define at one end a common point 52 and at the other end a free end 54. Alternatively, the legs 50 may be curved and/or the angle formed thereby at the point 52 may be other than a 90° angle. A suitable leg length for a particular manifold 12 is easily determined by routine experimentation. For example, a 7" wide manifold may have a 90° guide with legs 5.4" long.

As best seen in FIG. 2, the guide decreases in height from the common point 52 to the leg free ends 54 (e.g., from 3" to 0.5"). Additionally, in the preferred embodiment illustrated, the manifold top 24 is concave and the guide 14 does not extend to the concave top 24, so that some of the dough can pass between the guide 14 and the concave top 24. Thus, the dough preferably flows both around and above the guide 14.

Depending upon the particular construction of the assembly 10, and in particular the size thereof, the guide 14 may be secured to the adjacent surfaces of the manifold assembly 10 by means of a screw 53 or by welds, bolts, lock washer and set screw combinations, and the like, provided that the technique used is sufficiently secure that the guide 14 will be able to withstand the forces exerted thereon by the dough tending to move the guide with the dough.

A metering screw 44 is preferably disposed adjacent each die sub-assembly 31 and transverse to its dough-flow axis 32. The metering screw 44 may be rotated as required so that it extends more or less into the path of the dough flow to provide a final tuning, as necessary, to provide uniformity of flow. The metering screws 44 are capable of providing a relatively fine adjustment only once a substantially uniformity of flow has been established by the guide 14 in the manifold 12.

In operation, dough from a hopper is pumped through sanitary tubing into the inlet end 20 of the manifold assembly 10. By virtue of pump pressure (preferably 30–40 psi), the dough is distributed by the manifold assembly 10 to the several die sub-assemblies 31, the dough being extruded through the die discs 34 at the outlet end 22 to form the product strands. After extrusion and twisting, each continuous braid of dough is transported by a conveyor through an oil bath to a rotary blade or cutter which is preset to cut a selected length product. Finally, the cut product lengths are then conveyed to a fryer.

The machine according to the present invention makes a plurality (typically, twelve) continuous braids of dough, each braid containing multiple strands of dough extruded and twisted together by a rotating die. A nominal production rate for a machine of this type would be twenty-four cuts per minute producing a product of 40 grams weight and 5 ¼ inch length, for a total of 1,440 dozen products per hour.

EXAMPLE

In order to determine the efficacy of the present invention in producing twist sticks within a given weight specification, a twist stick machine with twelve rotating die sub-assemblies was set to operate with a pump speed of 12 rpm, a pump pressure of 35–40 psi, a twist speed of 25 rpm, and a conveyor speed through the oil bath of 137 in. per minute. Twenty-seven cuts were made per minute (each cut producing twelve twist sticks) to produce a product having a length of 5.25 in. Each of the twelve die sub-assemblies utilized a three-hole die disc having a 0.43 diameter hole on a bolt circle of 1 in. The weight specification for each twist stick was 40.0±2.5 gram (1.41±0.088 oz.).

One hundred and thirty-two twist sticks were made having a total weight of about 186.2 oz. The percentage of the twist sticks within the acceptable weight specification was 96.1%, an acceptable level. Of the 186.2 oz. of twist sticks produced, the total weight of the twist sticks outside of the acceptable weight specification was 7.3 oz. (3.5 oz. of the twist sticks being above the weight specification, and 3.8 oz. of the twist sticks being below the weight specification).

To summarize, the present invention provides a manifold assembly for feeding dough through a plurality of dies simultaneously under substantially equal pressure, even where the manifold assembly has more than two dies. The manifold assembly may be used to manufacture a twist stick product and is inexpensive to manufacture, simple and economical to use, and easy to maintain.

Now that the preferred embodiments have been shown and described in detail, various modifications and improvements thereon will become readily apparent to those skilled in the art. Accordingly, the spirit and scope of the present invention is to be construed broadly and limited only by the appended claims and not by the foregoing specification.

We claim:

1. A manifold assembly for feeding dough through a plurality of dies simultaneously under substantially equal pressure, said assembly comprising:

(A) a manifold having an inlet end for receiving dough under pressure and a dough-flow axis, an outlet end defining a plurality of extruder dies, each said die having a dough-flow axis, and a top, a bottom and sides connecting said inlet and outlet ends, said inlet end axis being generally transverse to said die axes;

(B) a substantially chevron-shaped dough guide intermediate said inlet and outlet ends for distributing the dough to the sides thereof, said guide being configured and dimensioned to distribute the dough to said dies simultaneously under substantially equal pressure.

2. The assembly of claim 1 wherein the point of said guide is generally centrally disposed intermediate said manifold sides, and points towards said inlet end.

3. The assembly of claim 1 wherein said manifold top is concave, and said guide does not extend to said concave top, whereby some of the dough can pass between said guide and said concave top.

4. The assembly of claim 3 wherein said guide has two legs defining at one end a common point and at the other end a free end of each leg, and said guide decreases in height from said common point thereof towards said leg free ends.

5. The assembly of claim 1 wherein said dies are disposed in a horizontal plane.

6. The assembly of claim 1 wherein said dies are disposed in a plurality of horizontally spaced rows.

7. The assembly of claim 1 wherein said dies are disposed below said inlet end.

8. The assembly of claim 1 wherein said manifold has a single inlet end and at least 12 dies.

9. A manifold assembly for feeding dough through a plurality of dies simultaneously under substantially equal pressure, said assembly comprising:

(A) a longitudinally-extending manifold having an inlet end for receiving dough under pressure and a dough-flow axis, an outlet end defining a plurality of extruder dies, each said die having a dough-flow axis, and a concave top, a bottom and sides connecting said inlet and outlet ends, said inlet end axis being generally transverse to said die axis;

(B) a substantially chevron-shaped dough guide intermediate said inlet and outlet ends for distributing the dough to the sides thereof, said guide not extending to said concave top, whereby some of the dough can pass between said guide and said concave top, said guide being configured and dimensioned to distribute the dough to said dies simultaneously under substantially equal pressure.

10. The assembly of claim 9 wherein said manifold has a single inlet end and at least 12 dies disposed in a plurality of horizontally spaced rows in a horizontal plane below said inlet end, and said guide is generally centrally disposed intermediate said manifold sides and points towards said inlet end.

11. The assembly of claim 9 wherein said guide has two legs defining at one end a common point and at the other end a free end of each leg, and said guide decreases in height from said common point thereof towards said leg free ends.

* * * * *